(12) United States Patent
Hoffmann

(10) Patent No.: US 7,057,369 B2
(45) Date of Patent: Jun. 6, 2006

(54) SYSTEM AND DEVICE FOR REGULATING THE POSITION OF A DRIVABLE COMPONENT AND DRIVE THEREFOR

(75) Inventor: Heinfried Hoffmann, Frankfurt am Main (DE)

(73) Assignee: Samson Aktiengesellschaft, Frankfurt (DE)

( * ) Notice: Subject to any disclaimer, the term of this patent is extended or adjusted under 35 U.S.C. 154(b) by 0 days.

(21) Appl. No.: 11/010,153

(22) Filed: Dec. 10, 2004

(65) Prior Publication Data

US 2005/0156554 A1 Jul. 21, 2005

(30) Foreign Application Priority Data

Dec. 22, 2003 (DE) .................. 103 60 434

(51) Int. Cl.
*G05F 1/00* (2006.01)

(52) U.S. Cl. ............... 318/647; 318/638; 324/200; 324/207.11; 324/207.13; 324/207.23; 324/207.25

(58) Field of Classification Search ............... 318/647, 318/638; 251/129, 65; 137/386; 324/200, 324/207.11, 207.13, 207.23, 207.25
See application file for complete search history.

(56) References Cited

U.S. PATENT DOCUMENTS

| | | | |
|---|---|---|---|
| 2,576,168 A | 11/1951 | Allen | 137/139 |
| 3,476,355 A | 11/1969 | Sherwood | 251/65 |
| 3,610,366 A * | 10/1971 | Goldberg | 181/120 |
| 3,625,473 A * | 12/1971 | Ignatjev | 251/65 |
| 3,675,171 A | 7/1972 | Kirk | 335/232 |
| 3,741,239 A | 6/1973 | Fiddiford | 137/408 |
| 3,774,878 A | 11/1973 | Martinez | 251/65 |
| 4,296,912 A | 10/1981 | Ruyak | 251/65 |
| 4,424,827 A | 1/1984 | Kägi et al. | 137/320 |
| 4,483,260 A * | 11/1984 | Gallant | 112/80.23 |
| 4,836,239 A * | 6/1989 | Kinkead | 137/413 |
| 4,957,274 A * | 9/1990 | Hood et al. | 251/129.12 |
| 5,179,888 A * | 1/1993 | Schendel et al. | 91/387 |
| 5,497,081 A * | 3/1996 | Wolf et al. | 324/207.12 |
| 5,757,181 A * | 5/1998 | Wolf et al. | 324/207.12 |
| 5,831,554 A * | 11/1998 | Hedayat et al. | 341/20 |
| 6,276,385 B1 * | 8/2001 | Gassman | 137/1 |
| 6,695,282 B1 * | 2/2004 | Clemens et al. | 251/129.04 |
| 6,831,380 B1 * | 12/2004 | Rybnicek et al. | 310/40 MM |

FOREIGN PATENT DOCUMENTS

| | | |
|---|---|---|
| DE | 1 018 686 | 10/1957 |
| DE | 1 043 125 | 11/1958 |

(Continued)

OTHER PUBLICATIONS

Search Report in DE 103 60 434.0 dated May 5, 2004.

*Primary Examiner*—Rita Leykin
(74) *Attorney, Agent, or Firm*—Marshall, Gerstein & Borun LLP

(57) ABSTRACT

A system for detecting the position of a component drivable by a control element drive, the system comprising: a position sensor housed in a position regulator housing, a movable motion representative to be driven by an actuating motion of the component, via which motion representative of a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact.

23 Claims, 3 Drawing Sheets

FOREIGN PATENT DOCUMENTS

| | | |
|---|---|---|
| DE | 1 210 285 | 2/1966 |
| DE | 1 239 902 | 3/1967 |
| DE | 1 961 838 | 6/1967 |
| DE | 1 921 166 | 10/1970 |
| DE | 2 017 528 | 11/1970 |
| DE | 2 028 591 | 2/1971 |
| DE | 2 063 223 | 8/1971 |
| DE | 24 43 687 | 4/1976 |
| DE | 29 33 115 | 3/1980 |
| DE | 30 27 351 | 2/1981 |
| DE | 30 28 965 A1 | 3/1981 |
| DE | 30 04 438 A1 | 8/1981 |
| DE | 32 27 245 C2 | 1/1984 |
| DE | 37 20 359 C1 | 6/1987 |
| DE | 91 17 070 U1 | 9/1995 |

* cited by examiner

SYSTEM AND DEVICE FOR REGULATING THE POSITION OF A DRIVABLE COMPONENT AND DRIVE THEREFOR

BACKGROUND

1. Field of the Disclosure

The disclosure relates to a system having a drivable component of a drive for a control element, such as a final control element like a valve, and a movable motion representative to be driven by the component. Furthermore, the disclosure relates to a position sensor for detecting the position of a drivable component of the drive for a final control element. In addition, the disclosure relates to a device for regulating the position of a final control element drivable by a drive. Finally, the disclosure relates to a drive for a final control element and a method for detecting the position of a drivable component.

2. Related Technology

A known position sensor, such as a potentiometer, is frequently used in an actuator, such as a lift and pivot drive, which may, for example, bring the actuating element of a valve into an open or closed position and/or into intermediate positions. In order to achieve desired operating parameters of the operating system to be influenced by the actuating element, such as a fluid circulation for petroleum or gas processing, a position regulator is provided which adjusts the position of the actuating element. The position sensors are implemented for the purpose of determining the precise position of the actuating element in order to provide an actual position signal to the position regulator to determine an actual state.

The position of the actuating element is calipered or monitored in a known way via a motion representative, which follows the motion of the actuating element because of a mechanical coupling between the motion representative and the component. The representative motion of the motion representative is detected by the position sensor.

Forming the mechanical coupling between the drivable component and the motion representative through engagement devices including a pin and oblong hole or tongue and groove arrangement is known. This type of connection typically has play, particularly for easy assembly, which may be compensated for by using a spring which provides a pre-tension. Providing the spring not only increases the manufacturing outlay because of the additional part, but also carries a risk of breakdown for the position sensor and therefore for the control loop, because expansion of the assembly play occurs, which can be amplified by breakdown of the pre-tension spring, particularly in the event of frequent load alternation, which may lead to loosening and, in some circumstances, to detachment of the mechanical connection. In addition, mechanical connections, particularly for use in chemical facilities, paper factories, or the like, are typically subjected to an aggressive surrounding medium, which encourages corrosion, vibration, and contamination of the individual parts. The mechanical couplings are therefore completely encapsulated in an area of use of this type, which also increases the manufacturing costs and, in addition, makes maintenance and/or repair of the sensor system difficult and, in some circumstances, less cost-effective than complete replacement.

Position sensors are usually housed in a position regulator housing, which is positioned neighboring a prime mover of an actuator, the motion representative projecting through the housing toward the component to be driven and being attached thereto to transmit force. In order to ensure rapid and easy replaceability of the position regulator, the motion representative must have an easily detachable transmission connection to the driven component of the actuator.

Using a direct sensor system, in which the position of the drivable component, particularly the actuating rod or the actuating shaft, is monitored directly at the component, is also known. This direct sensor system, which may be implemented by a Hall sensor, for example, is unsuitable for use in valves in particular, however, because a non-linearity of the measurement result is connected therewith, which may only be linearized via high pre-mounting outlay. The additional outlay is expressed above all in necessary reference measurements, which may be implemented using a mechanical clock gauge, which must be installed and uninstalled before beginning operation to determine reference variables. These measures are necessary upon each replacement of a sensor system.

DESCRIPTION

The disclosure provides a refined system having a drivable component of a drive for a final control element, and a movable motion representative to be driven by the component, in such a way that the disadvantages of the related art are overcome, in particular, taking into consideration a low tendency to wear and a low assembly cost, motions may be transferred from the drivable component to the motion representative with sufficient positional precision so that a typical position sensor may determine the position of the component.

According to the disclosure, a transmission is provided, with the aid of which drive motions of the component of the drive for a final control element, may be transferred to the motion representative without contact. The motion of the motion representative thus generated is detectable by a typical sensor, such as a potentiometer. The system according to the disclosure may dispense with any mechanical connections between the motion representative and the component, which significantly reduces the probability of breakdown because of wear. Furthermore, the piece count of the system of one component and one motion representative may be reduced. In addition, the assembly cost is significantly reduced because, for example, replaceability of a position regulator having position sensor may be performed without disconnecting mechanical connections between the motion representative in the drive.

This is particularly advantageous if, in a regulating system, final control elements, such as valves, are to be replaced frequently after a specific permissible operating time has expired or in the event of reliability check. Through the contactless transmission system according to the disclosure, the replacement may be completed without anything further. Adjustment procedures necessary in some circumstances upon reinstallation may be provided easily through mechanical stops or visual marks or dispensed with completely.

In a refinement of the disclosed system, the transmission part drives the motion representative using magnetic attraction and repulsion forces. For this purpose, the motion representative may particularly have a magnetic field and/or an electromagnetic field which, for the tracking of the motion representative, is assigned to transmit the motion of a magnetic field and/or electromagnetic field of the component. In a preferred embodiment, the magnetic field is generated by a permanent magnet which is attached to the motion representative and is assigned to a magnetic field which is generated by a permanent magnet on the component. A magnetic field generated by a permanent magnet is advantageous in relation to an electromagnetic field in that no power supply is necessary to build up the magnetic field. In many regulation systems, particularly in the field of petroleum and gas processing, in consideration of an explosion danger, triggered by electrical sparks, one of the necessary conditions is to design final control elements, such as valves, without electrical power supply or at least with the smallest possible electrical power consumption.

In order to guarantee the most precise possible position of the motion representative tracking the component, which corresponds to the position of the component, the poles of the pole pair of the component and those of the motion representative are positioned in a cross-shaped position to one another without contact in their force-transmitting setting; i.e., the north pole of the magnet of the motion representative is proximal to the south pole of the component and distal to the north pole of the component. This applies correspondingly for the south pole of the magnet of the motion representative.

In a preferred embodiment, a preferably translational or a rotational motion of the component may be converted and/or transferred into a pivoting or rotating motion of the motion representative. In this special embodiment, it is necessary for the motion representative to complete a rotating motion corresponding to the motion of the component which is easily detectable by the position sensor, such as a potentiometer or a Hall sensor. In addition, less space is required for a rotating motion of the motion representative than for a translationally displaced motion representative.

Alternatively, translational or rotational motion of the component may be converted or transferred into translational motion of the motion representative.

On the basis of the contactless force or motion transmission from the component to the motion representative according to the disclosure, the position sensor, including the motion representative, may be completely spatially separated from the drivable component of the actuator. In this way, it is possible to house the position sensor together with the motion representative in a closed housing, in particular to encapsulate them, through which the field of use of the system according to the disclosure may be expanded with minimized probability of breakdown because of corrosion or contamination and with simple uninstallation and installation. A dielectric material is preferably to be used for the housing enclosing the position sensor.

In order that the position change of the position sensor is detectable, the position sensor may have a potentiometer or a Hall sensor or a magnetic fluid sensor. The magnetic fluid sensor has a carrier fluid for magnetizable particles suspended therein, preferably a carrier liquid. The magnetizable fluid may be shaped into a path or channel using a non-ferromagnetic tube. Electrical contacts are provided at the path or channel ends in order to be able to monitor electrical variables, such as the resistance.

Preferably, a magnet attached to the motion representative may act on the magnetizable fluid in such a way that different resistance values, current values, or voltage values are detectable by a sensor, such as an ohmmeter, between the contacts, in accordance with the position of the magnets of the motion representative in relation to the contacts.

In an especially preferred embodiment, the motion representative has a magnetizable particle, particularly multiple magnetizable particles, which is/are suspended in a carrier fluid, particularly in a carrier liquid.

A magnet attached to the component influences the carrier fluid having the magnetizable particles in such a way that at least a part of the particles collect in a region proximal to the magnet. Depending on the position of the region concentrated with particles in relation to electrical contacts, different electrical variables may be measured at the contacts. The carrier fluid is contained in a receptacle, forming a channel and sealed fluid-tight, which is made of a non-ferromagnetic material.

The magnetic fluid sensor preferably may have a non-migrating oil having the necessary surface energy, admixed with magnetizable particles which are particularly suspended in the carrier fluid, such as a ferrite powder, which are provided with conductive carbon or more or less noble metals depending on the need for conductivity, particularly through partial surface coating of each particle, such as a ferrite grain.

In a preferred refinement, a correction device is provided on the motion representative and/or on the component, this correction device correcting deviations of the detected position of the component from the actual position, which occur in some circumstances. One error source may be caused by the transmission which is responsible for the contactless tracking of the motion representative. A correction device of this type may be formed by a Hall sensor, particularly a Hall sensor system having at least two Hall sensors, which is assigned to the magnetic field of the motion representative and/or that of the component. In this case, the Hall sensor may be configured through a prior setting of the operating parameters in such a way that it allows position errors occurring with high probability, which may occur during the contactless transmission of motion forces from the component to the motion representative, to also be incorporated in the analysis of the actual position signal. In particular, the Hall sensor may be configured in such a way or operationally coupled to a device of a type such that angular deviations from field lines generated by the magnets in relation to the field line angle to be expected in the event of correct position are detected. The correction signal is fed to a regulating device, which may determine the actual position of the component on the basis of the detected position signal and the correction signal in order to perform a correct regulation.

Furthermore, the disclosure relates to a position sensor for detecting the position of a drivable movable component of a drive for a final control element, such as a valve, the position sensor having a movable motion representative drivable by the component. Via the position of the motion representative, the position of the component is detectable, particularly by a potentiometer, such as a Hall sensor or a magnetic fluid sensor.

The position sensor includes the transmission for contactless relaying and/or redirection of motion forces from the component to the motion representative.

Furthermore, the disclosure relates to a device for regulating the position of a final control element movable by a drive, such as a valve, the device for regulating the position having a position sensor or a system according to the disclosure.

In addition, the disclosure relates to a drive, particularly a pivot or lift drive, for a final control element, particularly a valve, a system according to the disclosure being provided for the drive.

Finally, the disclosure relates to a method for detecting the position of the drivable component of a drive for a final control element, such as an armature or a field device, for example, a valve. The method is to be implemented in accordance with the mode of operation of the disclosed system.

DETAILED DESCRIPTION OF PREFERRED EMBODIMENTS

Figure 1:
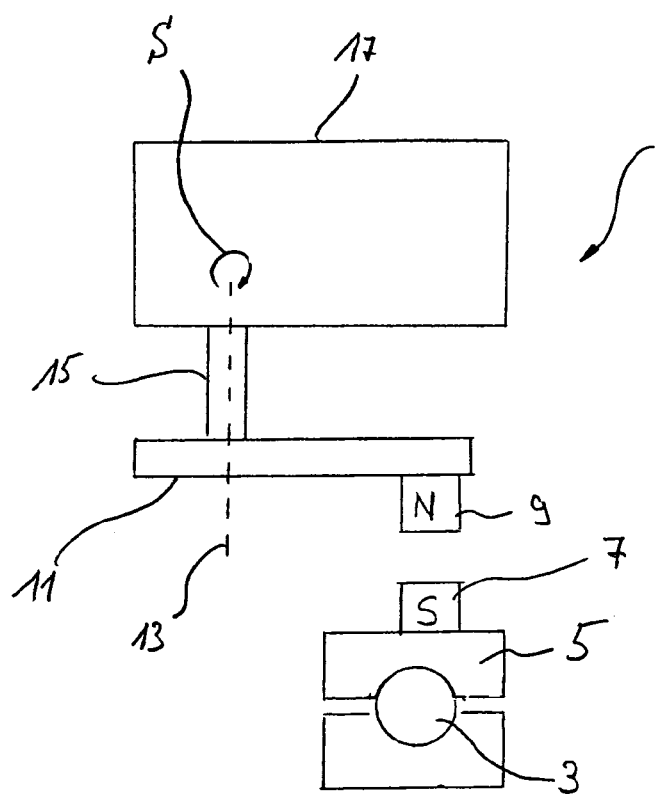
FIG. 1 shows a schematic sketch of an embodiment of a system having a drivable component and a motion representative.

FIG. 1 shows an embodiment of a system 1 having a drivable component, which is implemented as a valve rod 3, to which a carrier 5 is attached, which is permanently attached around the valve rod 3 like half shells comprising 2 shells. A permanent magnet 7 having a specific pole arrangement is attached to one side of a half shell of the carrier 5 facing away from the valve rod 3. The carrier 5 is attached removably to the valve rod 3 for the purpose of adjusting the magnet 7.

A permanent magnet 9 is permanently attached, diametrically opposing the magnet 7 at a distance, to a motion representative, implemented as a pivot lever arm 11, which has a pivot axis 13.

The motion representative has a connection shaft 15, whose lengthwise direction is coincident with the pivot axis 13. The connection shaft 15 extends into a housing 17 in which individual parts (not shown) of a regulating device are housed.

In particular, a rotational sensor (not shown) is housed in the housing 17, which detects the pivot motion S of the motion representative.

If the valve rod 3 is displaced translationally along its axis, the magnet 7 is also carried along. The magnetic fields of the magnets 7, 9 attract one another in such a way that the motion representative tracks the valve rod 3 in a pivot motion S. The type of tracking of the motion representative gives information about the position of the valve rod 3.

Using the system 1, a contactless coupling of the drivable component in the form of the valve 3 and the motion representative in the form of a pivot lever arm 11 is provided.

Figure 2:
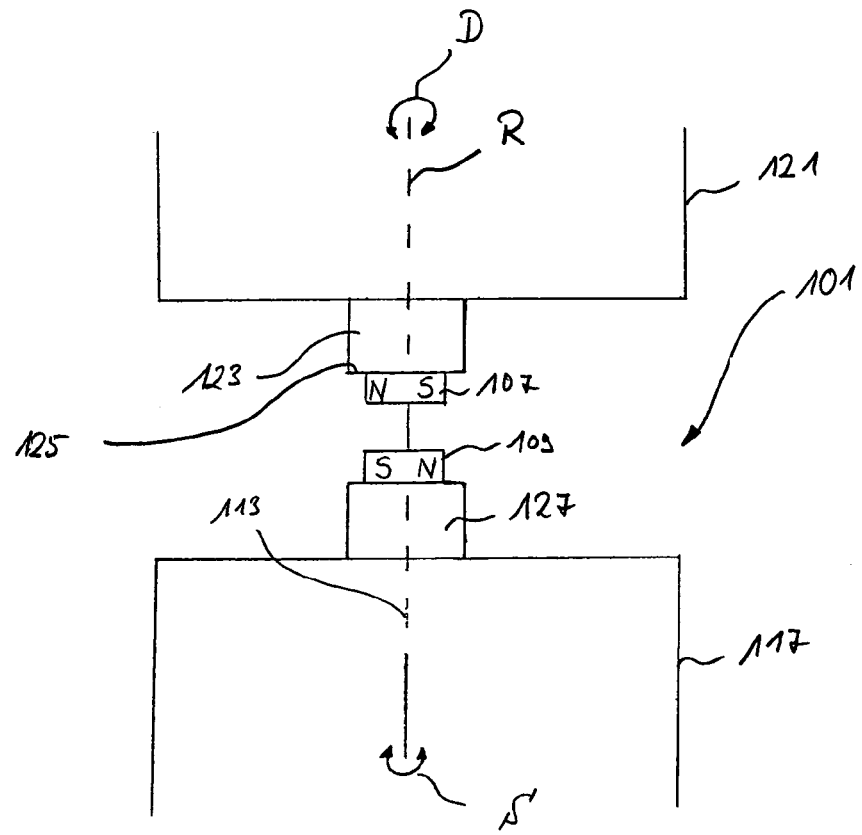
FIG. 2 shows a schematic sketch of a further embodiment of a system having a drivable component and a motion representative.

A further embodiment of a system is shown in FIG. 2, identical reference numbers which are increased by 100 being used for identical or similar components. For better readability of the description of the figure, there is no repeated explanation of the components already described.

The system 101 shows a drive housing 121, from which a sensor drive shaft 123 projects, via which a final control element (not shown) may be brought into a desired position. A permanent magnet 107 having a north and a south pole is recognizable at one free end 125 of the drive shaft 123, the north pole being positioned essentially to the left of the axis of rotation R of the drive shaft 123 when observing FIG. 2. The south pole is essentially to the right of the axis of rotation R.

A permanent magnet 109 is provided, diametrically opposing the permanent magnet 107 at a distance, which is attached to a motion representative implemented as a sensor output shaft 127.

The output shaft 127 projects into a housing 117 of a device for regulating a flow cross-section of a fluid loop (not shown) in particular. In the housing 117, among other things, a rotational position sensor (not shown) may be positioned, which may determine the rotational or pivot motion D of the component via the pivot or rotational motion S which occurs.

Figure 3:
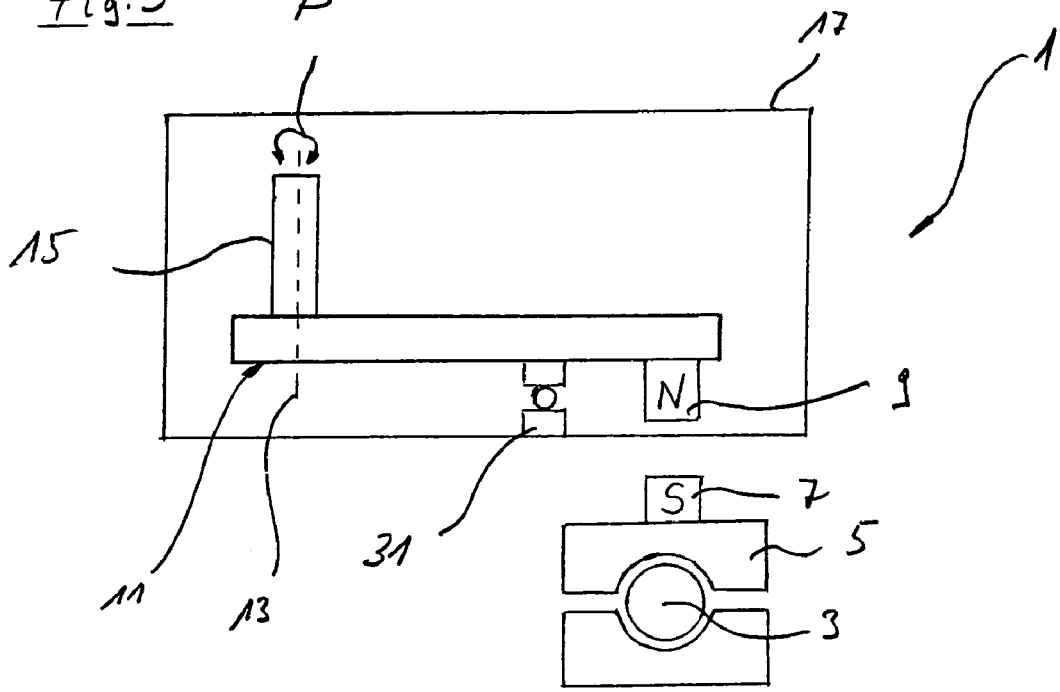
FIG. 3 shows a schematic sketch of an embodiment similar to the embodiment shown in FIG. 1, of a system in which the motion representative is housed in a housing.

FIG. 3 shows a refinement of the embodiment shown in FIG. 1, identical or similar components being provided with identical reference numbers. For better readability of the description of the figure, there is no repeated explanation of the components already described.

The embodiment shown in FIG. 3 differs from that shown in FIG. 1 in that the pivot lever arm 11 is housed fluid-tight, particularly encapsulated in the housing 17 of the regulating device.

A support bearing 31 having roller bodies is provided for mounting the motion representative 11, which moves in a pivot.

Figure 4:
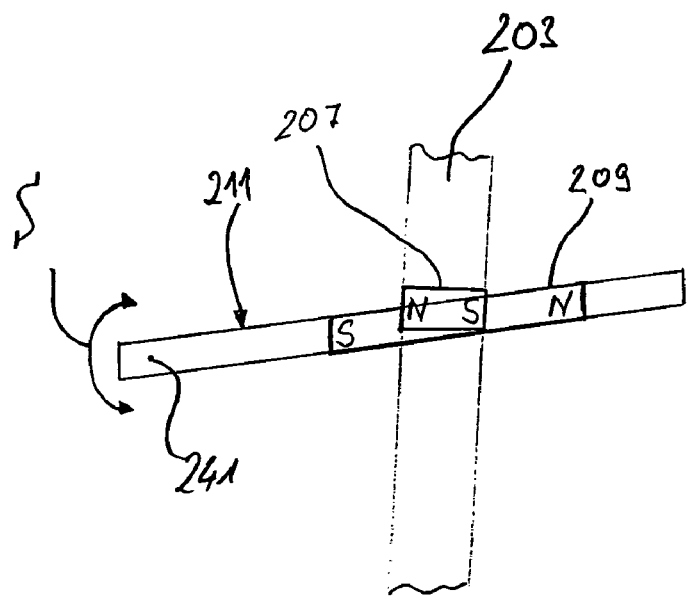
FIG. 4 shows a schematic sketch of a further embodiment of a system having a drivable component and a motion representative.

In the embodiment shown in FIG. 4, identical reference numbers which are increased by 200 are used for identical or similar components. For better readability of the description of the figure, there is no repeated explanation of the components already described.

The pivotably mounted pivot lever arm 211 comprises an essentially centrally positioned permanent magnet 209 which extends essentially along the pivot lever arm 211, a north pole lying on the end of the permanent magnet 209 distal to the pivot bearing 241 and a south pole lying on the proximal end of the permanent magnet 209.

A component in the form of a translationally driven valve rod 203 is indicated offset in the plane of the drawing, which has an essentially centrally positioned permanent magnet 209 having a north and south pole, the north and south poles being positioned in relation to the permanent magnet 209 in such a way that the north pole of the permanent magnet 207 lies closer to the south pole of the permanent magnet 209 and the south pole of the permanent magnet 207 lies closer to the north pole of the permanent magnet 209. Because of this cross arrangement of the magnetic poles, equalization of the lateral offset (in the lengthwise direction of the valve rod 203) is provided during transmission of the transitional motion of the component 203 into a pivot motion S of the motion representative.

Figure 5:
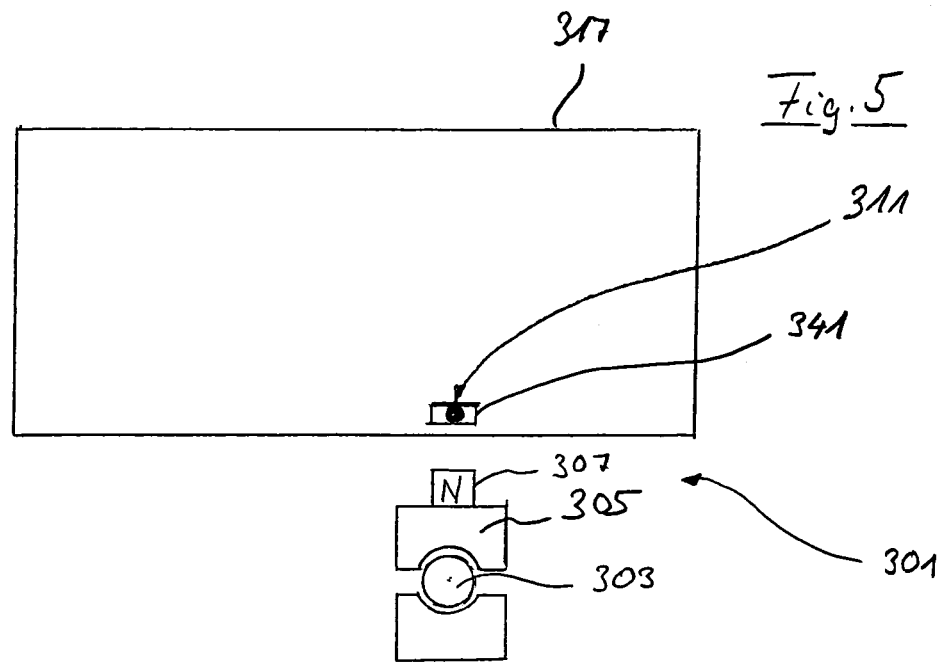
FIG. 5 shows a schematic sketch of a further, preferred embodiment of a system having a drivable component and a motion representative made of multiple individual elements.

A further special embodiment of the system is shown in FIG. 5, components which are similar and identical to the embodiment shown in FIGS. 1 and 4 being provided with identical reference numbers which are increased by 300. For better readability of the description of the figure, there is no repeated description of the components already described.

The system shown in FIG. 5 comprises a drivable component 303, to which a carrier 305 is attached, to which a permanent magnet 307 is permanently attached in turn.

As in the embodiment shown in FIG. 3, the motion representative is housed in an encapsulated housing 317. The motion representative in the embodiment shown in FIG. 5 is formed by multiple magnetizable particles which are suspended in a carrier fluid, which is preferably a non-migrating oil. The individual parts of the motion representative (not shown in greater detail) may be a ferrite powder or ferrite grains.

The fluid having the multiple motion representatives is housed in a closed channel having ferromagnetic wall 341, contacts (not shown) being provided essentially at the ends of the channel, via which a sensor, such as an ohm, ampere, or volt meter is connected. The section of carrier fluid having motion representative particles lying closest to the permanent magnet 307 has an elevated concentration of the particles because of the magnetizability of the representative particles, the position of this elevated particle concentration in relation to the two contacts (not shown) providing information about the position of the drivable component 303.

Figure 6:
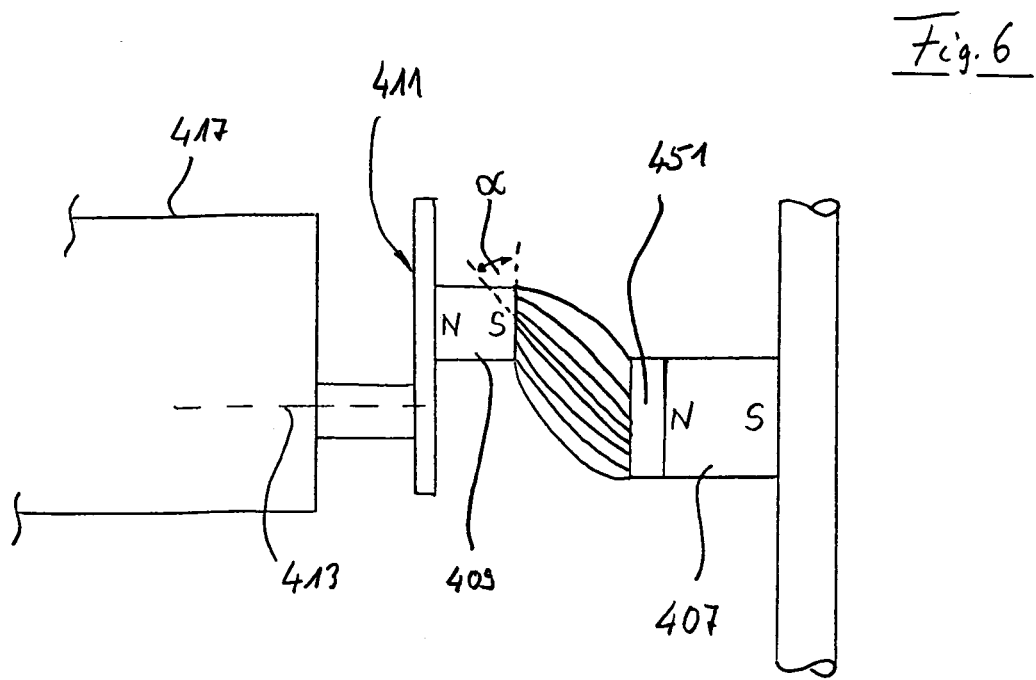
FIG. 6 shows a schematic sketch of a further embodiment of a system having a drivable component, a motion representative, and a device for equalizing a position error of the motion representative in relation to the component.

FIG. 6 shows a preferred embodiment of a system, which represents a refinement of the embodiment shown in FIGS. 1 through 5. Identical and similar components to those in the previously described embodiments are provided with identical reference numbers which are increased by 400. For better readability of the description of the figure, there is no repeated description of the components already described.

The embodiment shown in FIG. 6 differs from that shown FIG. 1 in that the system has a device for correcting an angular error, which may result through imprecise tracking of the motion representative in relation to the drivable component. The correction device may be implemented as a Hall sensor system 451 having at least two Hall sensors, which, particularly considering the magnets 407, 409 used and the adjustable distance of the magnets 407, 409 to one another, may determine an angular error a of the field lines of the magnet 409 of the motion representative in relation to the Hall sensor 451.

The correction signal generated by the Hall sensor 451 may be fed to a computer (not shown), which, in accordance with the position signal of the position sensor housed in the housing 417, which determines the position of the motion representative, calculates the actual position of the component.

The features disclosed in the foregoing description, the drawing figures, and the claims may be significant both individually and in any arbitrary combination for implementing the disclosure in its various embodiments.

What is claimed is:

1. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact.

2. The system of claim 1, wherein the component drives the motion representative using at least one of magnetic attraction forces and magnetic repulsion forces.

3. The system of claim 1, wherein the motion representative has at least one of a magnetic field and an electromagnetic field which, to track the motion representative, is assigned to at least one of a magnetic field and or electromagnetic field of the component in a way which transmits the motion force.

4. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact the motion representative having a first magnet assigned to a second magnet on the component to transmit motion forces for tracking the motion representative.

5. The system of claim 4, wherein the magnets of the motion representative and of the component each have a pole pair, the poles of the motion representative being positioned in a cross arrangement in relation to the poles of the component.

6. The system of claim 1, wherein a translational or rotational motion of the component may be converted into a pivot motion, translational motion, or rotational motion of the motion representative.

7. The system of claim 6, wherein the motion representative has a pivotably mounted lever arm or a translational mounted shaft.

8. The system of claim 1, wherein the component and the motion representative are spatially separated.

9. The system of claim 8, wherein the component and the motion representative are spatially separated by a housing that encloses the motion representative.

10. The system of claim 9, wherein the housing is made of a dielectric material.

11. The system of claim 1, wherein the position sensor is selected from the group consisting of Hall sensors, magneto-resistive sensors, and potentiometers.

12. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact, wherein the position sensor is selected from the group consisting of Hall sensors, magneto-resistive sensors, and potentiometers, and wherein the position sensor is formed by a fluid path lying between two electrical contacts.

13. The system of claim 12, wherein the fluid path has a fluid having added magnetizable powder, an ohmmeter being connected to the two electrical contacts.

14. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact, wherein the position sensor is selected from the group consisting of Hall sensors, magneto-resistive sensors, and potentiometers, and wherein the motion representative has a magnet assigned to a Hall sensor on a side facing away from the component.

15. The system of claim 11, wherein the position sensor is a potentiometer and the motion representative has a movably mounted magnet assigned to the potentiometer having a fluid path.

16. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact, wherein the component drives the motion representative using at least one of magnetic attraction forces and magnetic repulsion forces, and wherein the motion representative has magnetizable particles which are added to a carrier fluid with a carrier fluid path connecting two contacts.

17. The system of claim 16, wherein for driving the motion representative, the magnetizable particles are magnetizably assigned to a magnet in such a way that a region of the carrier fluid path having a higher concentration of magnetizable particles is formed.

18. A system for detecting the position of a component drivable by a control element drive, the system comprising: a position sensor housed in a position regulator housing, a movable motion representative to be driven by an actuating motion of the component, via which motion representative a position motion of the component is transferred into the position regulator housing to the position sensor, which sensor detects the position of the component via the position of the motion representative wherein a drive for transferring and/or redirecting the actuating motion of the component to the motion representative transmits actuating motion forces from the component to the motion representative without contact, and a correction device which equalizes a position deviation of the motion representative in relation to the component arising through the contactless transmission.

19. The system of claim 18, wherein the correction device comprises at least one Hall sensor positioned on at least one of the motion representative and the movable component and assigned to a magnet which is attached to at least one of the component and the motion representative.

20. The system of claim 19, wherein the Hall sensor detects an angular degree deviation of field lines of the magnet in relation to the Hall sensor in comparison to a normal position of the Hall sensor, and a deviation signal particularly able to be supplied to a regulation device is generated, which determines the actual position of the component on the basis of a position signal of the position sensor and the deviation signal.

21. A device for regulating the position of a drivable final control element, comprising a system of claim 1.

22. A drive for a final control element, comprising a system of claim 1.

23. A drive for a final control element, comprising a regulating device according to claim 21.

* * * * *